United States Patent
Chang et al.

(10) Patent No.: US 7,809,105 B2
(45) Date of Patent: Oct. 5, 2010

(54) VISION MEASURING SYSTEM HAVING VISION MEASURING APPARATUS

(75) Inventors: Chih-Kuang Chang, Taipei Hsien (TW); Sen Zhang, Shenzhen (CN); Xi-Liang Feng, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 1003 days.

(21) Appl. No.: 11/550,802

(22) Filed: Oct. 19, 2006

(65) Prior Publication Data
US 2007/0262211 A1     Nov. 15, 2007

(30) Foreign Application Priority Data
May 12, 2006    (CN)              2006 2 0139284

(51) Int. Cl.
*G01N 23/04*     (2006.01)
(52) U.S. Cl. .................................................... 378/62
(58) Field of Classification Search .................. 378/4, 378/21, 62, 98; 382/151, 173, 291; 702/35
See application file for complete search history.

(56) References Cited
U.S. PATENT DOCUMENTS

| | | | |
|---|---|---|---|
| 6,366,796 B1* | 4/2002 | Yanof et al. | 600/407 |
| 6,600,808 B2 | 7/2003 | Takada et al. | |
| 6,839,402 B2* | 1/2005 | Stabe et al. | 378/20 |
| 7,596,206 B2* | 9/2009 | Fuhrmann et al. | 378/62 |

* cited by examiner

*Primary Examiner*—Gwendolyn Baxter
(74) *Attorney, Agent, or Firm*—Wei Te Chung

(57) ABSTRACT

A vision measuring system includes a vision measuring apparatus. The apparatus includes a first body mechanism, a carrying stage movably mounted in the first mechanism for supporting an article thereon, a second body mechanism spanning the first mechanism, a third body mechanism movably mounted on the second mechanism, and an imaging device movably mounted to the third mechanism for picking up images of the article. Adjusting structures are installed on the apparatus for ensuring the device to be movable relative to the article in three directions perpendicular to one another. The system further includes a motion controller for controlling movements of the stage, the third mechanism, and the device, an input unit, a computer system for converting operating orders from the input unit into electronic signals and sending the electronic signals to the controller, and analyzing image data from the device, and an output unit for displaying analyzing results.

19 Claims, 12 Drawing Sheets

VISION MEASURING SYSTEM HAVING VISION MEASURING APPARATUS

BACKGROUND OF THE INVENTION

1. Field of the Invention

The present invention relates to measuring systems, and more particularly to a vision measuring system having a computerized numerical controlled (CNC) non contact vision measuring apparatus.

2. Description of Related Art

There is considerable interest across several industries in developing metrology systems for accurately measuring physical properties of various articles. Optical techniques are often preferable because they can be performed without contact with surfaces of the articles to be measured, thus there is no damage to the articles.

Conventionally, a vision measuring system that measures an article by imaging the article has been known. Typically, the vision measuring system includes a vision measuring apparatus, a motion controller, a host computer, and an output unit such as a monitor. The vision measuring apparatus includes an image pick-up device such as a charge-coupled device (CCD) camera. Through operation controlled by the motion controller, the image pick-up device is driven and moved in accordance with an area of an article to be measured, the image pick-up device takes images of the article, and image data of the images is transmitted to the host computer and analyzed by an analyzing unit of the host computer, thereby a plurality of properties of the article is output through the output unit. Presently, because there is an ever-present trend toward higher measurement accuracy arising from demands for various articles, there is a need for improving measurement accuracy of a vision measuring system.

What is desired, therefore, is a vision measuring system having a CNC non contact vision measuring apparatus, which provides high measurement accuracy.

SUMMARY OF THE INVENTION

In one preferred embodiment, a vision measuring system comprises a vision measuring apparatus. The vision measuring apparatus includes a first body mechanism, a carrying stage movably mounted in the first body mechanism, a second body mechanism spanning the first body mechanism, a third body mechanism movably mounted to the second body mechanism, an imaging device movably mounted to the third body mechanism for picking up images of an article to be measured set on an upper surface of the carrying stage, and driving means for driving the carrying stage, the third body mechanism, and the imaging device to move to thereby allow the imaging device to pick up images of the article in a variety of views. A direction of movement of the imaging device is perpendicular to the directions of movement of the carrying stage and the third body mechanism. Adjusting structures are installed on the vision measuring apparatus for ensuring the imaging device to be movable relative to the article in three directions perpendicular to one another. The vision measuring system further includes a motion controller for sending motion signals to control movements of the carrying stage, the third body mechanism, and the imaging device, an input unit for inputting operating orders, a computer system for converting the operating orders from the input unit into electronic signals and transmitting the electronic signals to the motion controller, and analyzing image data from the imaging device, and an output unit for displaying analyzing results from the computer system.

Other advantages and novel features will become more apparent from the following detailed description of preferred embodiments when taken in conjunction with the accompanying drawings, in which:

DETAILED DESCRIPTION OF THE INVENTION

Figure 1:
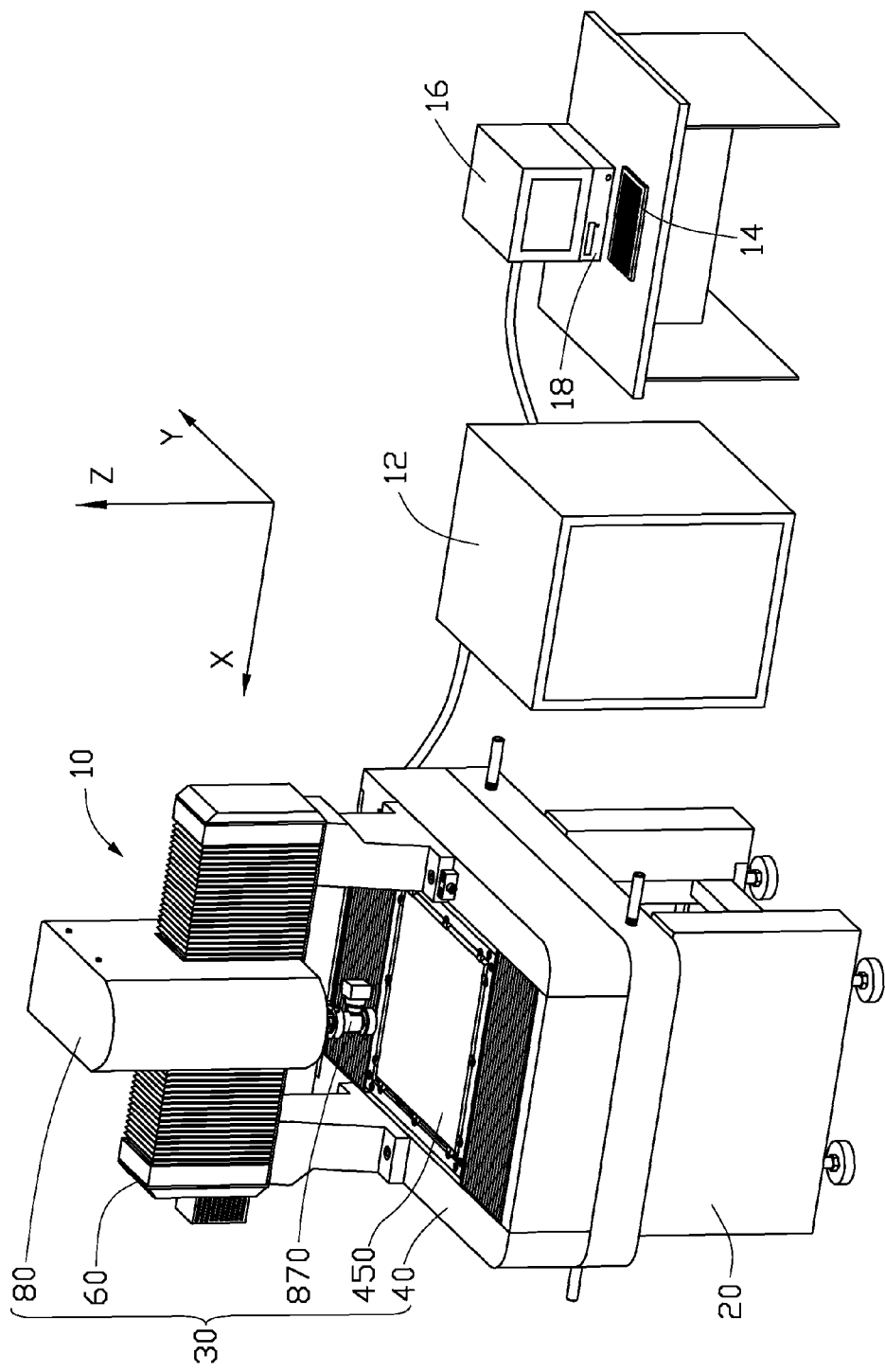
FIG. 1 is an isometric view of a vision measuring system including a vision measuring apparatus in accordance with a preferred embodiment of the present invention, the vision measuring apparatus including a first body mechanism, a carrying stage, a second body mechanism, a third body mechanism, and an imaging device.

Referring to FIG. 1, in a preferred embodiment of the invention, a vision measuring system includes a non contact vision measuring apparatus 10, a motion controller 12 for sending motion signals to control movements of the vision measuring apparatus 10, an input unit 14 such as a keyboard for inputting operating orders, an output unit 16 such as a monitor for displaying measurements, and a computer system 18, which processes and converts the operating orders from the input unit 14 into electronic signals and transmits the electronic signals to the motion controller 12, and analyzes image data from the vision measuring apparatus 10 and then transmits resulting measurements to the output unit 16.

The vision measuring apparatus 10 includes a pedestal 20, and a measurement unit 30 supported on the pedestal 20. The measurement unit 30 includes a first body mechanism 40, a carrying stage 450 horizontally movably disposed within the first body mechanism 40, a second body mechanism 60 spanning the first body mechanism 40 from side to side, a third body mechanism 80 mounted on the second body mechanism 60 and movable along the second body mechanism 60, and a vertically movable imaging device 870 mounted to the third body mechanism 80. The imaging device 870 such as a charge-coupled device (CCD) camera picking up images of an article placed on the carrying stage 450 includes an optical system and an image pick-up means.

Figure 2:
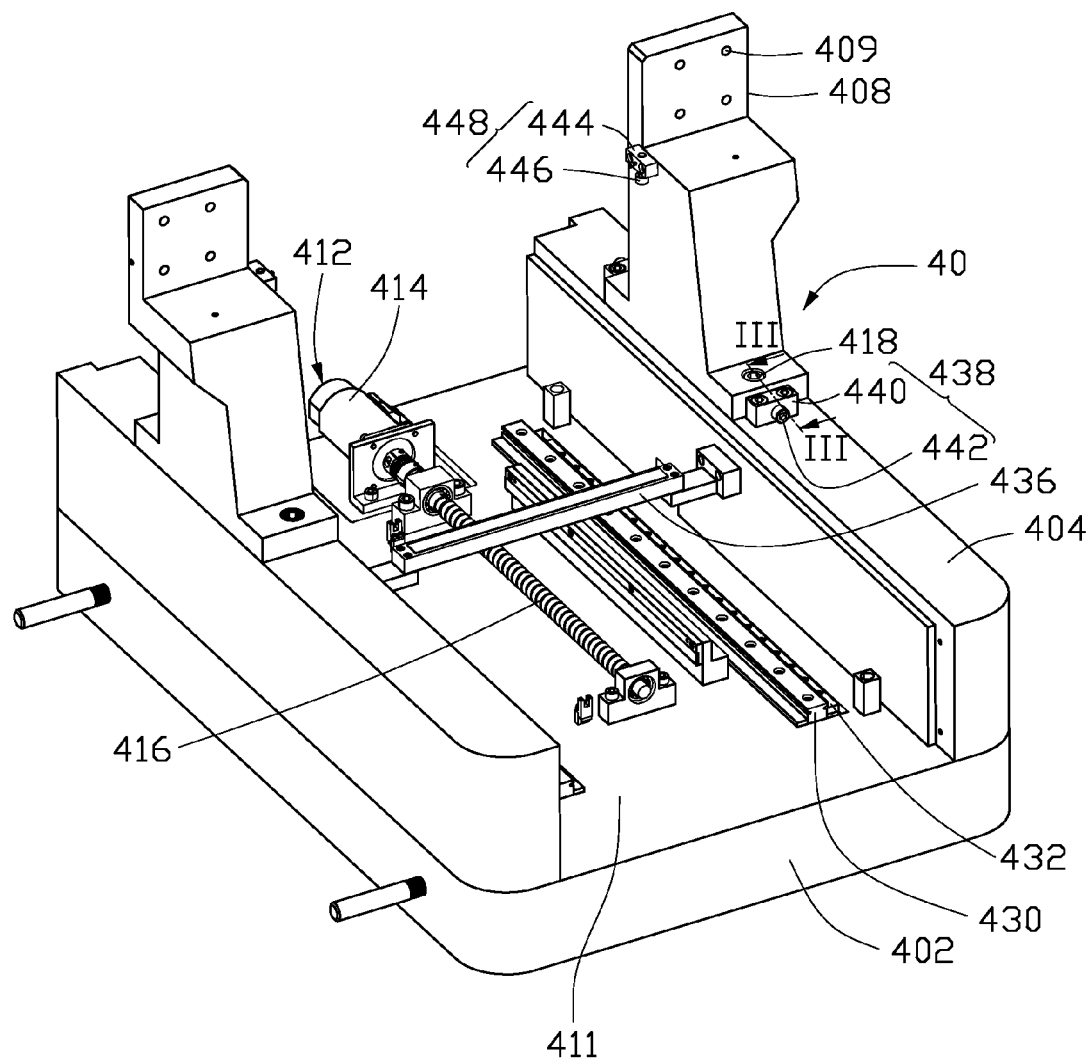
FIG. 2 is an enlarged view of the first body mechanism of FIG. 1, but viewed from another aspect.

Referring also to FIG. 2, the first body mechanism 40 includes a base 402 mounted on the pedestal 20, two stands 404 respectively extending up from two opposite sides of the base 402, and two support arms 408 respectively positioned on the two stands 404. A receiving space 411 is defined between the two stands 404 for receiving the carrying stage 450.

Two first linear rails 430 are located at the base 402 adjacent the two stands 404 respectively. A first drive 412 is secured on the base 402 between the first rails 430. The first drive 412 includes a first actuator such as a first servo motor 414, and a first lead screw 416 driven by the first servo motor 414. Two first adjusting devices 432 are secured on the base 402 adjacent the two first rails 430 respectively. Each first adjusting device 432 has a plurality of adjusting components such as bolts screwed therethrough. Ends of the bolts abut against a corresponding first rail 430 to adjust the first rail 430 in parallel with the first lead screw 416. An illuminator 436 is secured over the base 402 between the stands 404.

Figure 3:
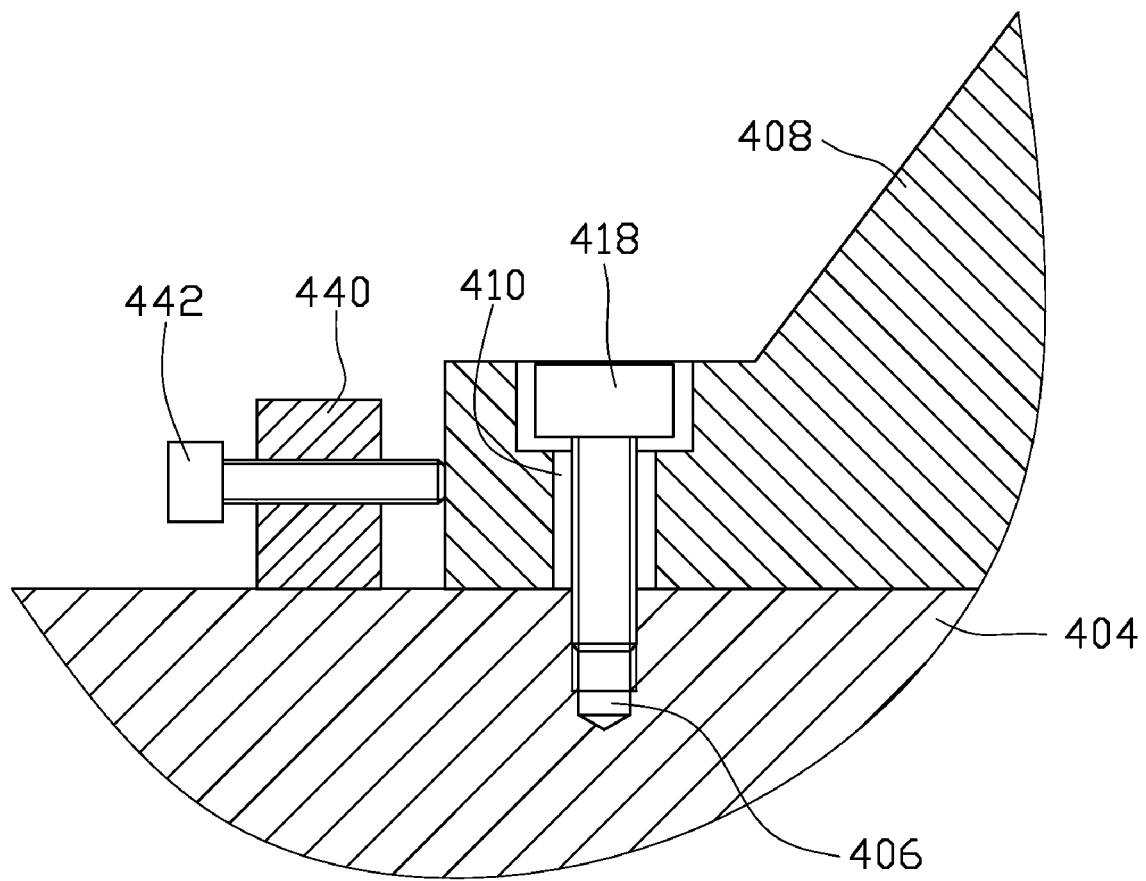
FIG. 3 is a partial, cross-sectional view taken along line III-III of FIG. 2.

Referring also to FIG. 3, two through holes such as countersinks 410 are respectively defined in two ends of each support arm 408. Each stand 404 defines two mounting holes such as threaded holes 406 in a top thereof, corresponding to the two countersinks 410 of one corresponding support arm 408. A plurality of fasteners such as bolts 418 is respectively extended through the countersinks 410 of the two support arms 408 and screwed into the corresponding threaded holes 406 of the two stands 404. Thereby the two support arms 408 are respectively mounted on the corresponding stands 404. Two first adjusters 438 are positioned on one of the two stands 404 neighboring two ends of the corresponding support arm 408 respectively to adjust the support arm 408 relative to the corresponding stand 404. Each first adjuster 438 includes a first installing block 440 secured on the stand 404 adjoining one end of the corresponding support arm 408, and a first adjusting member 442 such as an adjusting bolt screwed through the first installing block 440. Ends of the two adjusting members 442 respectively abut against the two ends of the support arm 408. Diameters of the two countersinks 410 of the support arm 408 are greater than those of the corresponding bolts 418, thus when one of the first adjusting members 442 is screwed or unscrewed and the other one is correspondingly unscrewed or screwed, the support arm 408 is adjusted relative to the corresponding stand 404. A plurality of connecting holes such as threaded holes 409 is defined in an upper portion of each of the two support arms 408 to secure the second body mechanism 60 to the upper portions of the two support arms 408. A second adjuster 448 is placed at an inner surface of each support arm 408. Each second adjuster 448 includes a second installing block 444 secured to the upper portion of a corresponding support arm 408, and a second adjusting member 446 such as an adjusting bolt screwed through the second installing block 444.

Figure 4:
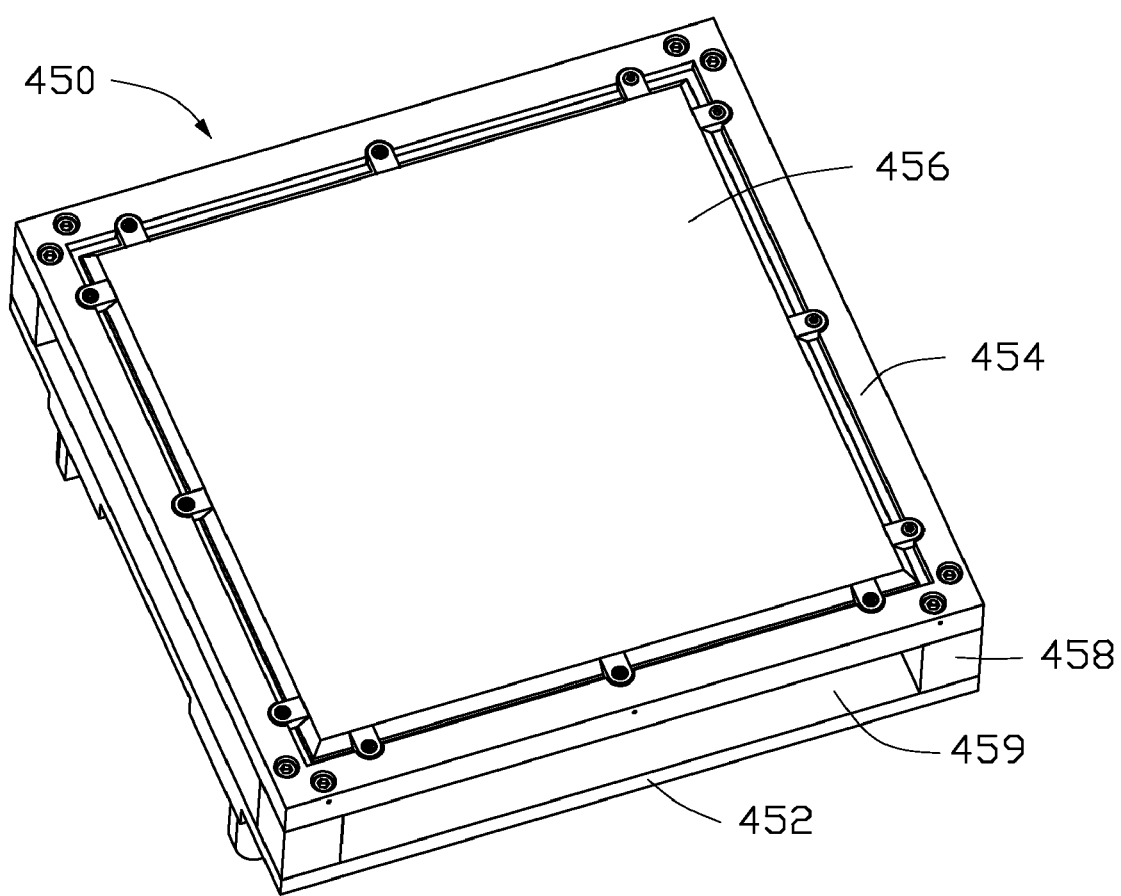
FIG. 4 is an enlarged view of the carrying stage of FIG. 1, but viewed from another aspect.
Figure 5:
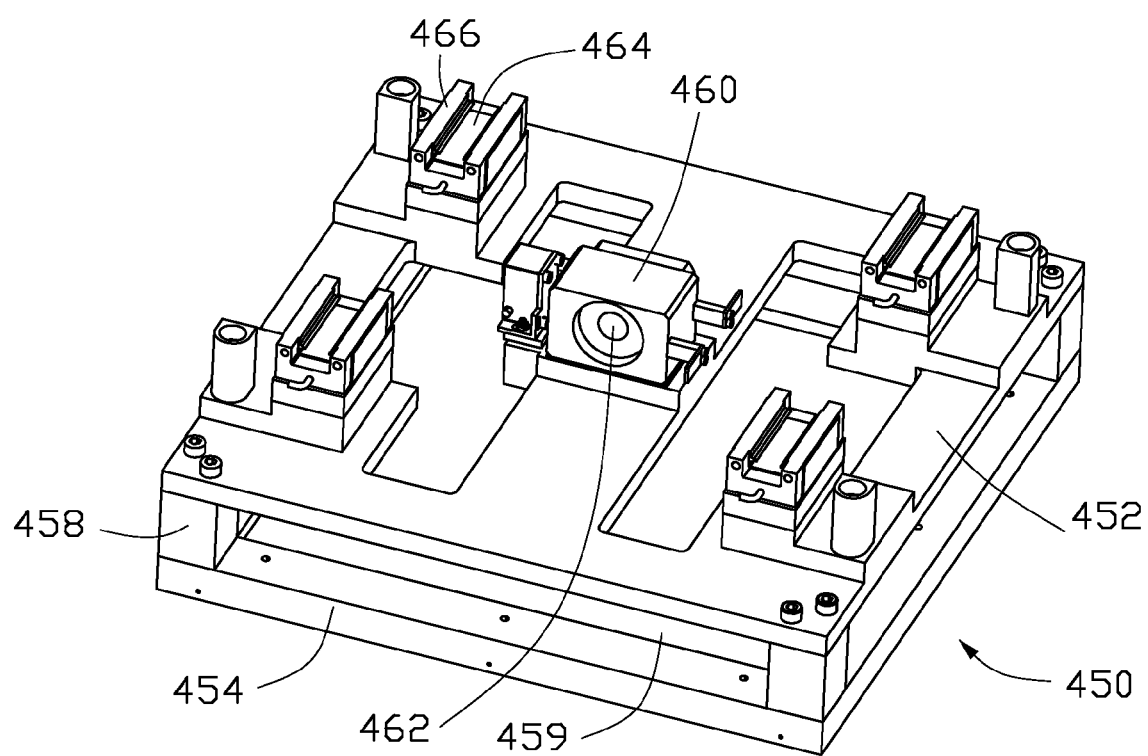
FIG. 5 is similar to FIG. 4, but an inverted view.

Referring also to FIGS. 4 and 5, the carrying stage 450 includes a quadrate support plate 452, a hollow frame 454 corresponding to the support plate 452, and a light transmittance plate such as a glass plate 456 received in the hollow frame 454. The hollow frame 454 is supported over the support plate 452 by four support blocks 458 placed onto four corners of the support plate 452. A sliding space 459 is defined between the support plate 452 and the hollow frame 454. A first engaging member 460 defining a first engaging opening 462 for engaging with the first lead screw 416 is attached to a central portion of an underside of the support plate 452. Two pairs of first linear sliders 466 are respectively secured to two opposite sides of the underside of the support plate 452. Each first slider 466 defines a first sliding channel 464 for a corresponding first rail 430 being slidably embedded therein. Midlines of the first sliding channels 464 are parallel to a centerline of the first engaging opening 462 of the first engaging member 460.

Figure 6:
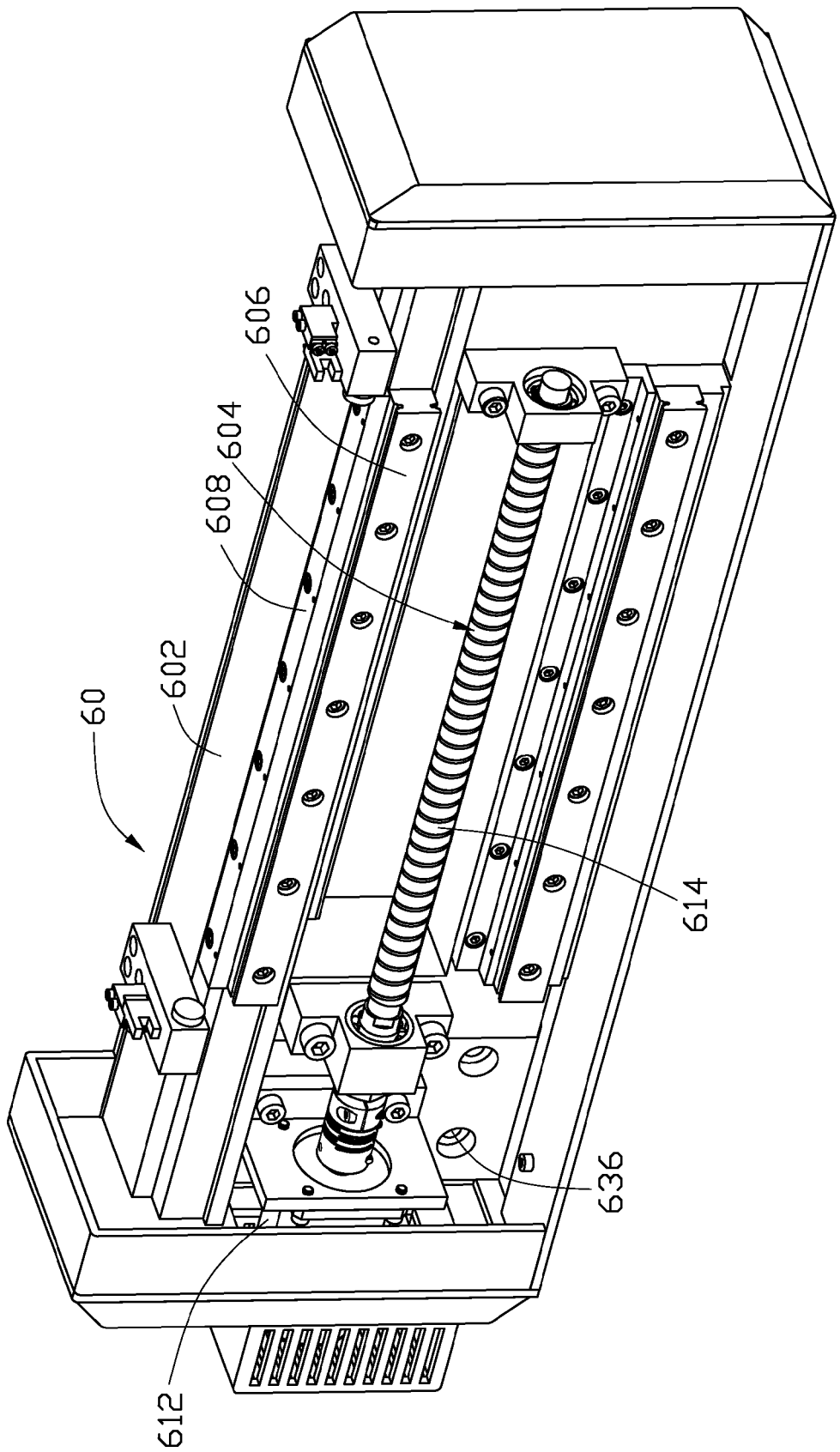
FIG. 6 is an enlarged view of the second body mechanism of FIG. 1.
Figure 7:
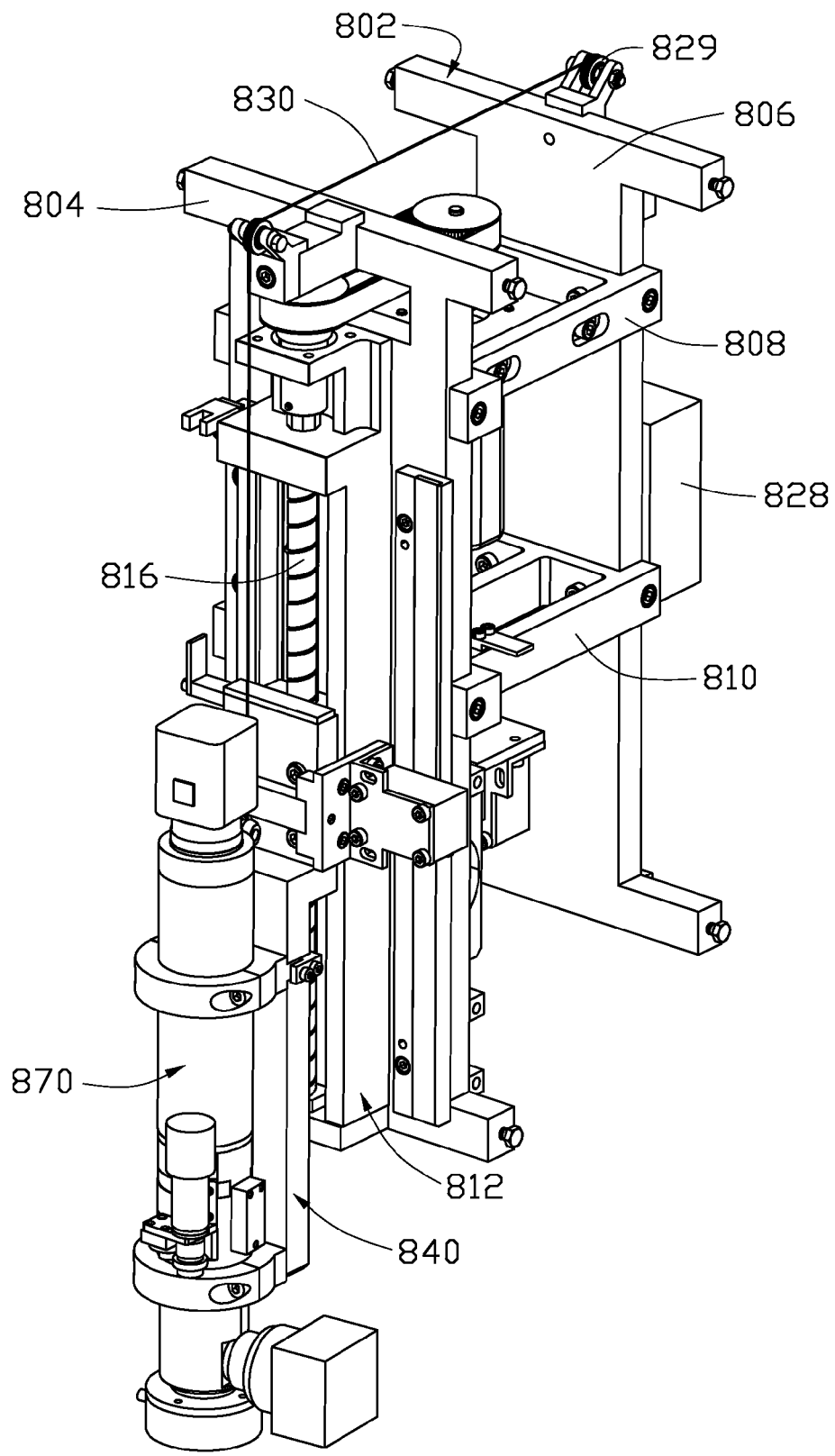
FIG. 7 is an enlarged view of the combined third body mechanism and imaging device of FIG. 1.
Figure 8:
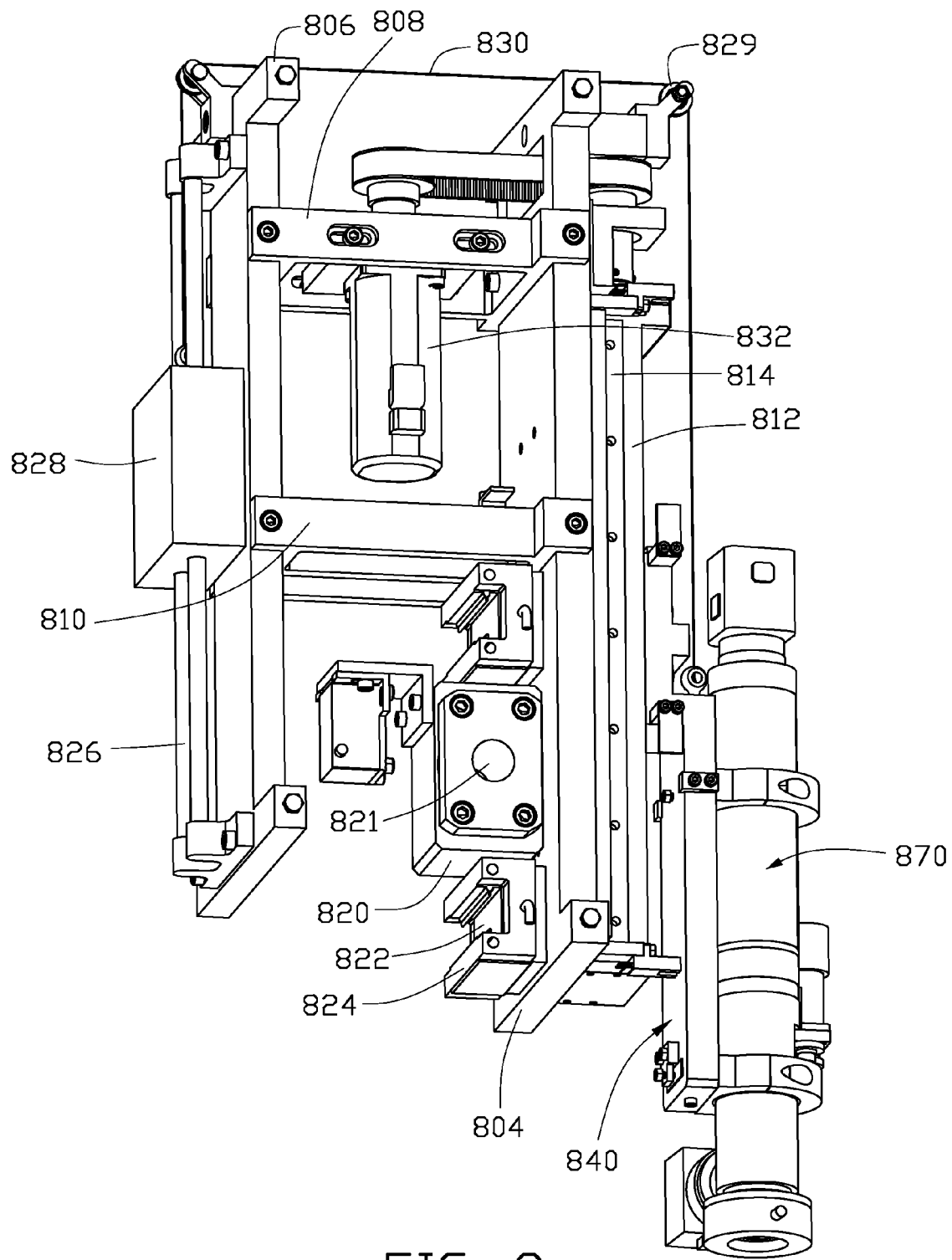
FIG. 8 is similar to FIG. 7, but viewed from another aspect.
Figure 9:
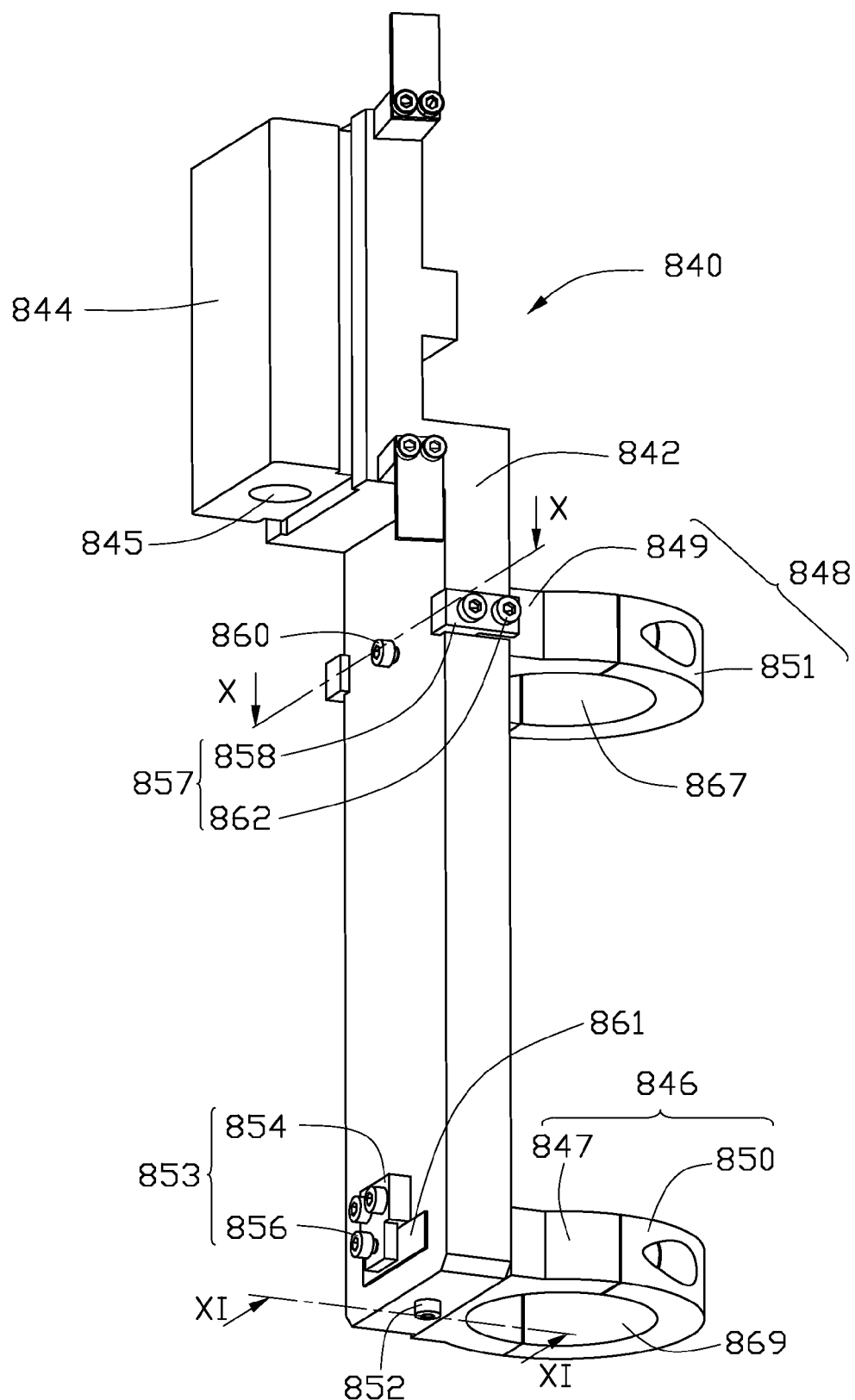
FIG. 9 is an enlarged view of a second sliding assembly of FIG. 8.
Figure 10:
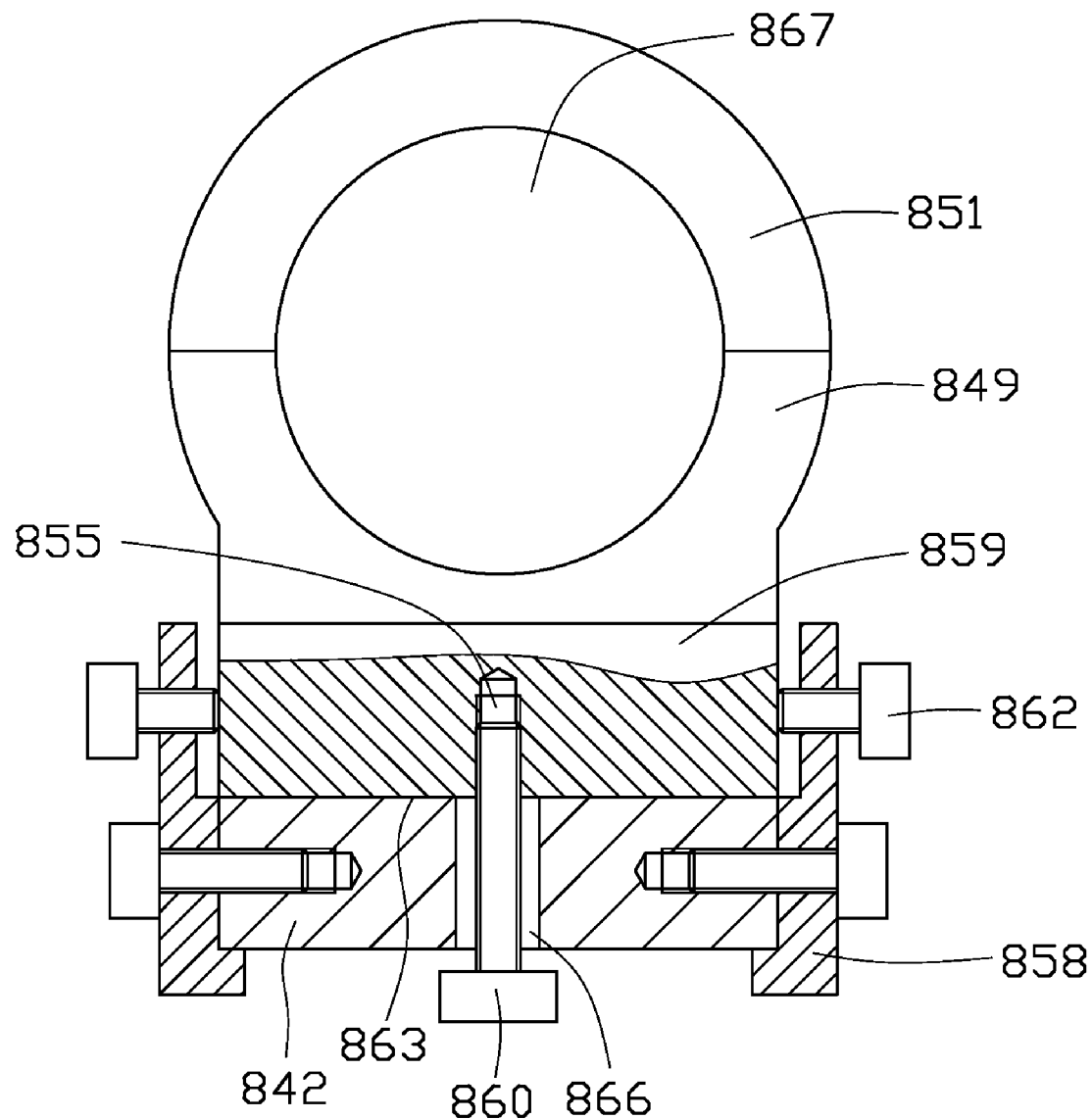
FIG. 10 is a partial, cross-sectional view taken along line X-X of FIG. 9.
Figure 11:
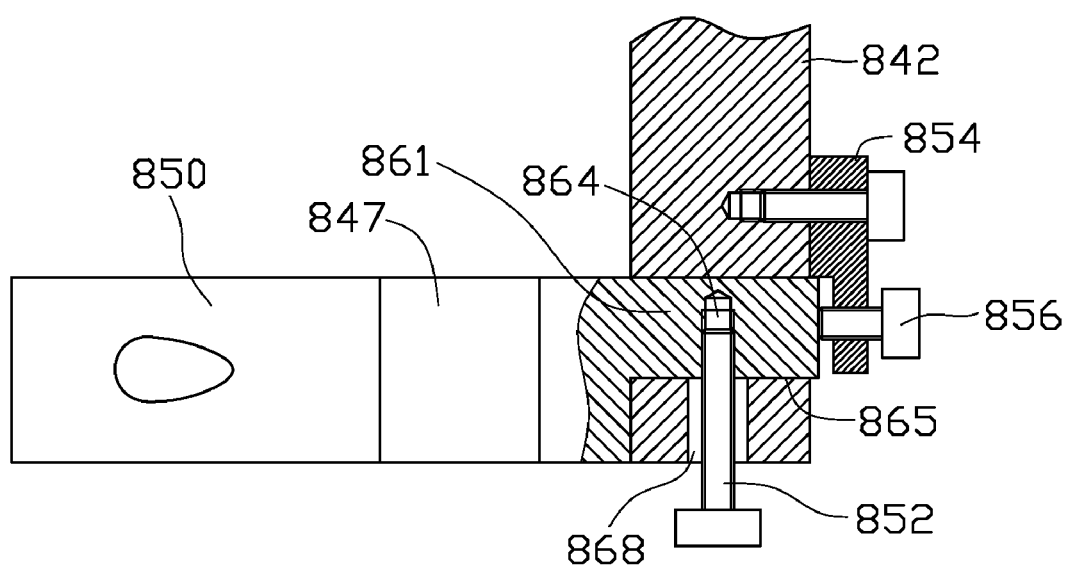
FIG. 11 is a partial, cross-sectional view taken along line XI-XI of FIG. 9.
Figure 12:
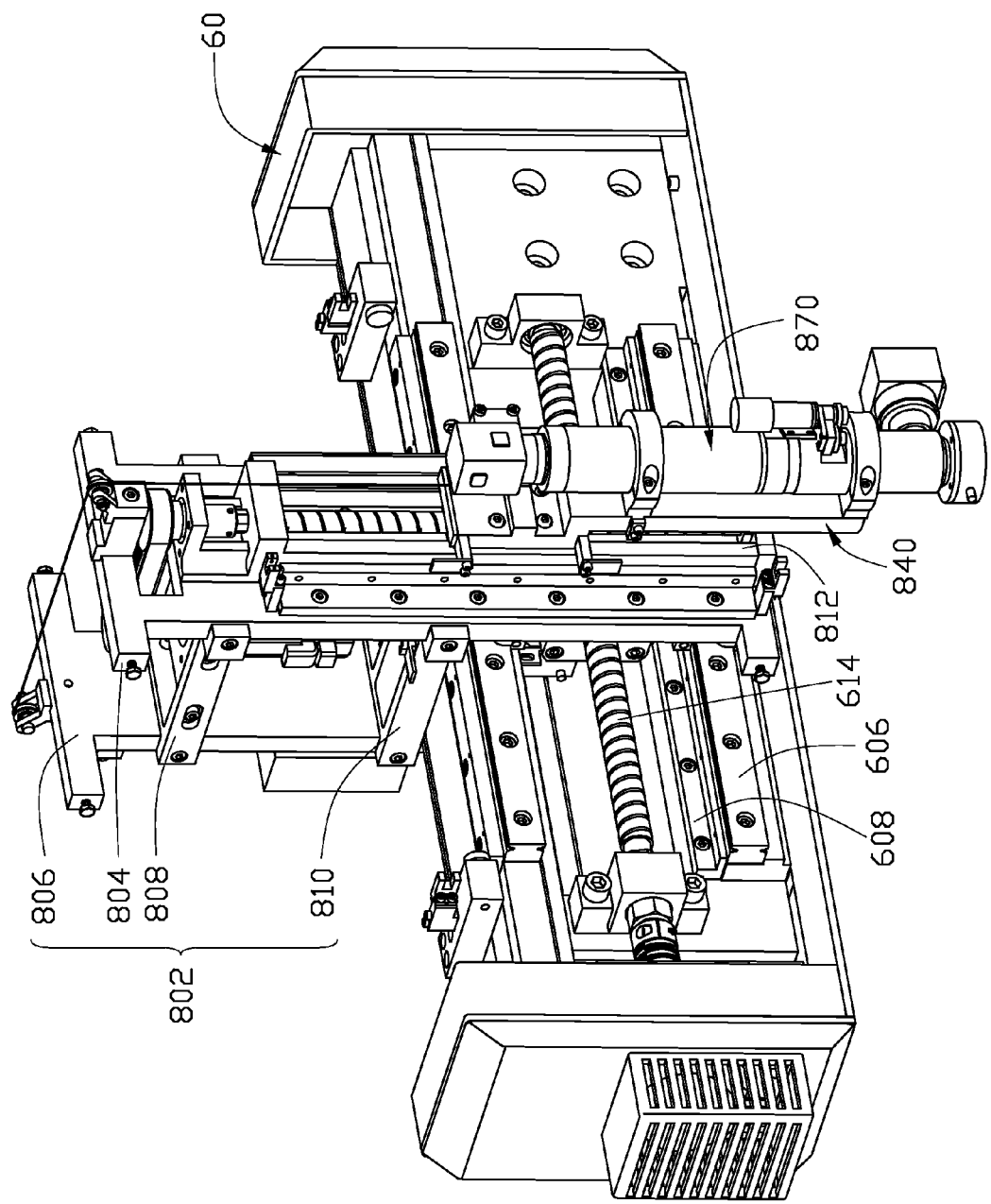
FIG. 12 is an enlarged assembled view of the second body mechanism, the third body mechanism and the imaging device of FIG. 1, but viewed from another aspect.

Referring also to FIG. 6, the second body mechanism 60 includes a horizontal beam 602, a second drive 604 horizontally secured to a front side of the beam 602, two second linear rails 606 horizontally respectively placed on an upper portion and a lower portion of the front side of the beam 602, and two second adjusting devices 608 installed to the front side of the beam 602 neighboring the two second rails 606 respectively. Each end of the beam 602 defines a plurality of installing holes such as countersinks 636 corresponding to the threaded holes 409 of one corresponding support arm 408. The second drive 604 includes a second actuator such as a second servo motor 612, and a second lead screw 614 driven by the second servo motor 612. Each second adjusting device 608 has a plurality of adjusting components such as bolts screwed therethrough. Ends of the bolts abut against a corresponding second rail 606 to adjust the corresponding second rail 606 in parallel with the second lead screw 614.

Referring also to FIGS. 7 to 12, the third body mechanism 80 includes a first sliding assembly 802 horizontally movably mounted on the second body mechanism 60, and a second sliding assembly 840 vertically mounted on the first sliding assembly 802. The imaging device 870 is attached to the second sliding assembly 840. The first sliding assembly 802 includes a first side plate 804 and a second side plate 806 respectively located at a front side and a back side of the beam 602, and a first support frame 808 and a second support frame 810 positioned over the beam 602 and joining the first and second side plates 804, 806 together. A lead screw device 812 with a third lead screw 816 is vertically mounted to a front surface of the first side plate 804. A third adjusting device (also referred to as a third adjuster) 814 is vertically attached to the front surface of the first side plate 804 neighboring the lead screw device 812. The third adjusting device 814 has a plurality of adjusting components such as bolts screwed therethrough. Ends of the bolts abut against the lead screw device 812 to adjust the lead screw device 812.

A third actuator such as a third servo motor 832 is secured to the first support frame 808. A transmission strap surrounds a rotating shaft of the third servo motor 832 and one end of the third lead screw 816 of the lead screw device 812, thereby the third lead screw 816 is driven by the third servo motor 832. A second engaging member 820 defining a second engaging opening 821 for engaging with the second lead screw 614 is secured to a back surface of the first side plate 804. Two second linear sliders 824 are attached to the back surface of the first side plate 804 adjoining a top and bottom of the second engaging member 820 respectively. Each second linear slider 824 defines a second sliding channel 822 for a corresponding second rail 606 being slidably embedded therein. Midlines of the second sliding channels 822 are parallel to a centerline of the second engaging opening 821 of the second engaging member 820.

Two parallel elongated rods 826 are vertically secured to a back surface of the second side plate 806. A weight block 828 is movably mounted on the two elongated rods 826. Two pulleys 829 are respectively supported on top portions of the first and second side plates 804, 806. A steel rope 830 is positioned on the two pulleys 829, and spans between upper portions of the first and second side plates 804, 806. Two ends of the steel rope 830 are respectively tied to the weight block 828 and second sliding assembly 840, thus the weight block 828 is to prevent the lead screw device 812 and imaging device 870 from freely falling under their own weight.

The second sliding assembly 840 includes a supporter 842, a slide block 844 attached to a back surface of the supporter 842, and a first fixture 848 and a second fixture 846 secured to a front surface of the supporter 842. The slide block 844 defines a third engaging opening 845 for engaging with the third lead screw 816 of the lead screw device 812 (see FIG. 7). The first fixture 848 includes a first support portion 849, and a first installing portion 851 attached to the first support portion 849. The first support portion 849 and the corresponding first installing portion 851 cooperatively define a first holding opening 867 for securing the imaging device 870. A first projecting portion 859 extends out from the first support portion 849. The second fixture 846 includes a second support portion 847, and a second installing portion 850 attached to the second support portion 847. The second support portion 847 and the corresponding second installing portion 850 cooperatively define a second holding opening 869 for securing the imaging device 870. A second projecting portion 861 extends out from the second support portion 847. The supporter 842 defines a notch 863 and a through slot 865, respectively corresponding to the first and second projecting portions 859, 861. The first projecting portion 859 defines a first fixing hole such as threaded hole 855 at an end thereof. The second projecting portion 861 defines a second fixing hole such as threaded hole 864 in a bottom thereof. The supporter 842 defines a first elongated hole 866 and a second elongated hole 868, respectively corresponding to a first threaded hole 855 and a second threaded hole 864. The first and second fixtures 848, 846 are secured on the supporter 842 by two fasteners 860, 852 such as two bolts respectively being screwed into the first and second threaded holes 855, 864 via the first and second elongated holes 866, 868.

Two fourth adjusters 857 are respectively located at two opposite sides of the supporter 842 to adjust the first fixture 848 in a right and left direction. Each fourth adjuster 857 includes a third installing block 858 secured to the supporter 842 adjacent the first projecting portion 859 of the first fixture 848, and a third adjusting member 862 such as an adjusting bolt screwed through the third installing block 858. Ends of the two third adjusting members 862 respectively abut against two ends of the first projecting portion 859 of the first fixture 848, thus the first projecting portion 859 of the first fixture 848 is sandwiched between the two third adjusting members 862. The fastener 860 is movable in the corresponding first elongated hole 866, when one of the two third adjusting members 862 is screwed or unscrewed, the other one is correspondingly unscrewed or screwed, the first projecting portion 859 of the first fixture 848 is movable in the notch 863 and the first fixture 848 is adjusted in a right and left direction.

A fifth adjuster 853 is placed on the back surface of the supporter 842 to which the slide block 844 is attached. The fifth adjusters 853 includes a fourth installing block 854 secured to the back surface of the supporter 842, and a fourth adjusting member 856 such as an adjusting bolt screwed through the fourth installing block 854. An end of the fourth adjusting member 856 abuts against an end of the second projecting portion 861 of the second fixture 846. The fastener 852 is movable in the corresponding second elongated hole 868, when the fourth adjusting member 856 is screwed or unscrewed, the second projecting portion 861 of the second fixture 846 is movable, and the second fixture 846 is adjusted in a back and forth direction.

Referring to FIGS. 1 to 12 together, in assembling and regulating the vision measuring apparatus, the carrying stage 450 is placed into the receiving space 411 between the two stands 404. The first lead screw 416 of the first drive 412 is inserted through the first engaging opening 462 of the first engaging member 460 of the carrying stage 450. The illuminator 436 is received into the sliding space 459 between the support plate 452 and hollow frame 454 of the carrying stage 450 to allow the illuminator 436 being movable in the sliding space 459. The two first rails 430 are respectively embedded in the first sliding channels 464 of the two pairs of first linear sliders 466. When the first lead screw 416 is driven by the first servo motor 414, the first linear sliders 466 smoothly slide on the corresponding first rails 430, thereby the carrying stage 450 is movable along the two stands 404 in a back and forth direction (referred to as a first dimensional direction hereafter).

The two support arms 408 are respectively secured on the two stands 404. The beam 602 of the second body mechanism 60 spans between the upper portions of the two support arms 408 of the first body mechanism 40. The second body mechanism 60 is horizontally mounted on the two support arms 408 via a plurality of fasteners such as bolts (not shown) being respectively passed through the countersinks 636 of the beam 602 and screwed into the corresponding thread holes 409 of the two support arms 408. Ends of the second adjusting members 446 of the two second adjusters 448 abut against a bottom of the beam 602 of the second body mechanism 60. Diameters of the countersinks 636 of the beam 602 are greater than those of the corresponding bolts, thus the beam 602 of the second body mechanism 60 is adjusted relative to the two support arms 408 in an up and down direction via driving the second adjusting members 446 of the second adjusters 448.

The first sliding assembly 802 spans the beam 602 of the second body mechanism 60. The second lead screw 614 of the second drive 604 is inserted in the second engaging opening 821 of the second engaging member 820, and the two second rails 606 are respectively embedded in the second sliding channels 822 of the two second linear sliders 824. When the second lead screw 614 is driven by the second servo motor 612, the second linear sliders 824 smoothly slide on the corresponding second rails 606 and the first sliding assembly 802 slides along the beam 602.

The third lead screw 816 of the lead screw device 812 is inserted in the third engaging opening 845 of the slide block 844 of the second sliding assembly 840, thus the second sliding assembly 840 is mounted on the first sliding assembly 802. The imaging device 870 is received in the first and second holding openings 867, 869 of the first and second fixtures 848, 846 via the first and second installing portions 851, 850 being respectively secured to the first and second support portions 849, 847.

The first adjusting members 442 of the two first adjusters 438 are driven, and the support arm 408 is adjusted relative to the corresponding stand 404. When an axis of the second lead screw 614 of the second drive 604 becomes perpendicular to the first dimensional direction, the support arms 408 are firmly secured on the corresponding stands 404 via the bolts 418 being completely screwed into the corresponding mounting holes 406 of the stands 404. Then the second adjusting members 446 of the two second adjusters 448 are driven, and the beam 602 is adjusted relative to the two support arms 408. When the axis of the second lead screw 614 of the second drive 604 becomes parallel to an upper surface of the glass plate 456 of the carrying stage 450, the beam 602 of the second body mechanism 60 is firmly secured on the two support arms 408 via the bolts being completely screwed into the corresponding thread holes 409 of the two support arms 408. A direction of movement of the first sliding assembly 802 along the second body mechanism 60, namely the axis of the second lead screw 614, is referred to as a second dimensional direction.

Then the bolts of the third adjusting device 814 are driven, and the lead screw device 812 is adjusted relative to the first side plate 804 of the first sliding assembly 802. When an axis of the third lead screw 816 of the lead screw device 812 becomes perpendicular to the axis of the second lead screw 614, the lead screw device 812 is firmly secured to the first side plate 804. When the third lead screw 816 is driven by the third servo motor 832 of the first sliding assembly 802, the second sliding assembly 840 is movable along the lead screw device 812. The direction of movement of the second sliding assembly 840 along the lead screw device 812 is referred to as a third dimensional direction.

Then the third adjusting members 862 of the two fourth adjusters 857 and the fourth adjusting member 856 of the fifth adjuster 853 are driven, thereby the first and second fixtures 848, 846 are adjusted. When an optical axis of the image device 870 becomes parallel to the third dimensional direction, the first and second fixtures 848, 846 are firmly secured to the supporter 842 of the second sliding assembly 840 via the two fasteners 860, 852 respectively completely screwed in the corresponding first and second threaded holes 855,864 of the first and second fixtures 848, 846. Thus the imaging device 870 and second sliding assembly 840 are stably movable together.

When an article (not shown) is put on the upper surface of the glass plate 456 of the carrying stage 450, illumination is provided by light emission of the illuminator 436 through the glass plate 456 below the article. The computer system 18 converts operating orders from the input unit 14 into electronic signals and sends the electronic signals to the motion controller 12. The three servo motors 414, 612, 832 are controlled by the motion controller 12 which sends motion signals to the servo motors 414,612, 832, the carrying stage 450, the first sliding assembly 802 and the combined second sliding assembly 840 and imaging device 870 are respectively driven by the three servo motors 414, 612, 832, thereby the imaging device 870 is moved about in three directions perpendicular to one another and takes images of the article in a variety of views. Image data of the images is transmitted to the computer system 18 that analyzes the image data, and results from the computer system 18 are displayed on the output unit 16.

By configuration of the adjusters in the vision measuring apparatus, various mechanisms of the vision measuring apparatus are relatively adjusted to desired positions, manufacturing error of parts and assembling error of the vision measuring apparatus are minimized. Thus the vision measuring apparatus is provided with high measurement accuracy by virtue of elimination of systematic error of the vision measuring apparatus itself.

It is believed that the present embodiment and its advantages will be understood from the foregoing description, and it will be apparent that various changes may be made thereto without departing from the spirit and scope of the invention or sacrificing all of its material advantages, the example hereinbefore described merely being preferred or exemplary embodiment.

What is claimed is:

1. A vision measuring apparatus comprising:
    a first body mechanism;
    a carrying stage movably mounted in the first body mechanism, the carrying stage being movable relative to the first body mechanism in a first direction;
    a second body mechanism spanning the first body mechanism;
    a third body mechanism movably mounted on the second body mechanism;
    an adjusting structure adjusting the second body mechanism to allow the third body mechanism to move along the second body mechanism in a second direction perpendicular to the first direction and parallel to an upper surface of the carrying stage;
    an imaging device movably mounted to the third body mechanism, a direction of movement of the imaging device relative to the third body mechanism being perpendicular to the first and second directions, the imaging device being configured for picking up images of an article to be measured set on the upper surface of the carrying stage; and
    driving means for driving the carrying stage, the third body mechanism, and the imaging device to move to thereby allow the imaging device to pick up images of the article in a variety of views.

2. The vision measuring apparatus as claimed in claim 1, wherein the first body mechanism comprises a base, two stands respectively extend up from two opposite sides of the base, and two support arms respectively mounted on the two stands, the carrying stage is horizontally mounted between the two stands and movable along the two stands, and the second body mechanism spans between upper portions of the two support arms and over the carrying stage.

3. The vision measuring apparatus as claimed in claim 2, wherein the adjusting structure comprises at least one first adjuster disposed on one of the two stands to adjust one corresponding support arm in the first direction relative to the one of the two stands to ensure the second direction to be perpendicular to the first direction.

4. The vision measuring apparatus as claimed in claim 3, wherein the first adjuster has a first installing block secured on the one of the two stands, and a first adjusting member engaged through the first installing block, and an end of the first adjusting member abuts against the corresponding support arm to drive the corresponding support arm to move relative to the one of the two stands in the first direction.

5. The vision measuring apparatus as claimed in claim 4, wherein the corresponding support arm, which the end of the first adjusting member abuts against, defines a through hole, the one of the two stands defines a mounting hole corresponding to the through hole, the corresponding support arm is mounted on the one of the two stands via a fastener being passed through the through hole and engaged in the mounting hole, and diameter of the through hole is greater than diameter of the corresponding fastener.

6. The vision measuring apparatus as claimed in claim 3, wherein the adjusting structure further comprises at least one second adjuster positioned on one of the two support arms to adjust the second body mechanism relative to the two support arms to ensure the second direction to be parallel to the upper surface of the carrying stage.

7. The vision measuring apparatus as claimed in claim 6, wherein the second adjuster comprises a second installing block secured on the one of the two support arms, and a second adjusting member engaged through the second installing block, and an end of the second adjusting member abuts against a bottom of the second body mechanism.

8. The vision measuring apparatus as claimed in claim 7, wherein the two support arms each define a plurality of connecting holes, the second body mechanism comprises a horizontal beam, the horizontal beam defines a plurality of installing holes corresponding to the connecting holes, the second body mechanism is attached to the two support arms of the first body mechanism via a plurality of fasteners being respectively passed through the installing holes of the horizontal beam and engaged in the connecting holes of the two support arms, and diameters of the installing holes of the horizontal beam are greater than diameters of the corresponding fasteners.

9. The vision measuring apparatus as claimed in claim 1, wherein the third body mechanism comprises a first sliding assembly horizontally movably mounted on the second body mechanism, and the first sliding assembly comprises a first side plate, a second side plate, and a first support frame and a second support frame to connect the first side plate and second side plate together.

10. The vision measuring apparatus as claimed in claim 9, wherein the third body mechanism further comprises a second sliding assembly vertically movably mounted to the first sliding assembly, the second sliding assembly comprises a first fixture and a second fixture, the first fixture and the second fixture respectively define a first holding opening and a second holding opening, for securing the imaging device, and the combined imaging device and second sliding assembly are movable together.

11. The vision measuring apparatus as claimed in claim 10, wherein the first fixture has a first support portion and a first installing portion attached to the first support portion, the second fixture has a second support portion and a second installing portion secured to the second support portion, the first holding opening is cooperatively defined by the first support portion and the corresponding first installing portion, and the second holding opening is cooperatively defined by the second support portion and the corresponding second installing portion.

12. The vision measuring apparatus as claimed in claim 11, wherein a lead screw device and a third adjuster adjacent the lead screw device are vertically mounted to the first side plate, the second sliding assembly is vertically movably mounted to the lead screw device, the third adjuster has a plurality of bolts screwed therethrough, ends of the bolts of the third adjuster abut against the lead screw device, and the bolts of the third adjuster are being drivable to adjust the lead screw device to ensure the second sliding assembly to move along the lead screw device perpendicular to the second direction.

13. The vision measuring apparatus as claimed in claim 12, wherein the second sliding assembly further comprises a supporter and a slide block attached to a back surface of the supporter, the first support portion of the first fixture and the second support portion of the second fixture are attached to a front surface of the supporter, the lead screw device comprises a lead screw driven by a servo motor, the slide block defines an engaging opening corresponding to the lead screw, and the second sliding assembly is vertically movably mounted on the lead screw device via the lead screw being slidably engaged in the engaging opening of the slide block.

14. The vision measuring apparatus as claimed in claim 13, wherein a first projecting portion with a first fixing hole and a second projecting portion with a second fixing hole respectively extend out from the first support portion and the second support portion, the supporter defines a notch and a through slot for respectively receiving the first projecting portion and the second projecting portion, and a first elongated hole and a second elongated hole, respectively corresponding to the first fixing hole and the second fixing hole, and the first fixture and the second fixture are secured on the supporter via the first projecting portion and the second projecting portion being respectively placed in the notch and the through slot and two fasteners respectively being passed through the first elongated hole and the second elongated hole and engaged in the first fixing hole and the second fixing hole.

15. The vision measuring apparatus as claimed in claim 14, wherein two fourth adjusters are respectively secured on two opposite sides of the supporter to adjust the first projecting portion of the first fixture in the second direction, a fifth adjuster is placed to the back surface of the supporter to adjust the second projecting portion of the second fixture in the first direction, and the first fixture and the second fixture are adjusted to render an optical axis of the image device to be parallel to the direction of movement of the second sliding assembly.

16. The vision measuring apparatus as claimed in claim 15, wherein each of the two fourth adjusters comprises a third installing block secured on the supporter adjacent the first projecting portion of the first fixture, and a third adjusting member screwed through the third installing block, and ends of the two third adjusting members respectively abut against two ends of the first projecting portion of the first fixture.

17. The vision measuring apparatus as claimed in claim 16, wherein the fifth adjuster comprises a fourth installing block secured on the back surface of the supporter, and a fourth adjusting member screwed through the fourth installing block, and an end of the fourth adjusting member abuts against an end of the second projecting portion of the second fixture.

18. A vision measuring system comprising:
a first body mechanism;
a carrying stage movably mounted in the first body mechanism, the carrying stage being movable relative to the first body mechanism in a first direction;
a second body mechanism spanning the first body mechanism;
a third body mechanism movably mounted on the second body mechanism;
an adjusting structure adjusting the second body mechanism to allow the third body mechanism to move along the second body mechanism in a second direction perpendicular to the first direction and parallel to an upper surface of the carrying stage;
an imaging device movably mounted to the third body mechanism, a direction of movement of the imaging device relative to the third body mechanism being perpendicular to the first and second directions, the imaging device being configured for picking up images of an article to be measured that is put on the upper surface of the carrying stage;
driving means for driving the carrying stage, the third body mechanism, and the imaging device to move to thereby allow the imaging device to pick up images of the article in a variety of views;
a motion controller for sending motion signals to control the driving means to thereby control movements of the carrying stage, the third body mechanism, and the imaging device;
an input unit for inputting operating orders;
a computer system configured for converting the operating orders from the input unit into electronic signals and transmitting the electronic signals to the motion controller, and analyzing image data from the imaging device; and
an output unit for displaying analyzing results.

19. A vision measuring system comprising:
a first body mechanism;
a carrying stage movably mounted to the first body mechanism and configured for supporting an article thereon, the carrying stage being movable relative to the first body mechanism in a back and forth direction;
a second body mechanism mounted to the first body mechanism;
a third body mechanism movably mounted to the second body mechanism;

an imaging device movably mounted to the third body mechanism via a sliding member and configured for picking up images of the article;

driving structures for driving the carrying stage, the third body mechanism, and the sliding member to move;

a first adjusting structure provided between the first and second body mechanisms and configured for adjusting the second body mechanism in the back and forth direction and an up and down direction to ensure the third body mechanism to be movable along the second body mechanism in a left and right direction;

a second adjusting structure provided between the sliding member and the third body mechanism and configured for adjusting the sliding member to ensure the imaging device to be movable relative to the third body mechanism in the up and down direction;

a motion controller configured for controlling movements of the carrying stage, the third body mechanism, and the sliding member via sending motion signals to the driving structures;

an input unit configured for inputting operating orders;

a computer system configured for converting the operating orders from the input unit into electronic signals and transmitting the electronic signals to the motion controller, and analyzing image data from the imaging device; and an output unit configured for displaying analyzing results of the computer system.

* * * * *